US005477254A

United States Patent [19]

Stephens

[11] Patent Number: 5,477,254

[45] Date of Patent: Dec. 19, 1995

[54] APPARATUS FOR MOUNTING AND ALIGNING COMPONENTS OF AN INK JET PRINTHEAD

[75] Inventor: David J. Stephens, Springboro, Ohio

[73] Assignee: Scitex Digital Printing, Inc., Dayton, Ohio

[21] Appl. No.: 860,483

[22] Filed: Mar. 30, 1992

[51] Int. Cl.$^{6}$ .......... G01D 15/18

[52] U.S. Cl. .......... 347/74; 347/73

[58] Field of Search .......... 347/73, 74, 75, 347/76, 77, 84, 86, 90, 49, 78

[56] References Cited

U.S. PATENT DOCUMENTS

| | | | |
|---|---|---|---|
| 4,080,607 | 3/1978 | Van Breemen et al. | 347/74 |
| 4,238,805 | 12/1980 | Paranjpe et al. | 347/76 |
| 4,277,790 | 7/1981 | Heibein et al. | 347/49 |
| 4,538,157 | 8/1985 | Jones | 347/76 |
| 4,550,320 | 10/1985 | Biser et al. | 347/77 |
| 4,672,390 | 6/1987 | Ishikawa | 347/74 |
| 5,115,251 | 5/1992 | Gray | 347/74 |

*Primary Examiner*—Sandra L. Brase
*Attorney, Agent, or Firm*—Barbara Joan Haushalter

[57] ABSTRACT

An apparatus and method allows for mounting and aligning of the charge plate/catcher assembly and the droplet generator within the structure that holds these two parts. Three degrees of freedom of adjustment are incorporated into the frame and are self-locking. Two of the degrees of freedom are the positioning distance of a jet array to charge leads and the parallelism of the jet array to the charge leads. The third degree of freedom is the ability to adjust the jet array so as to align and center the jets in front of the charge leads.

20 Claims, 2 Drawing Sheets

APPARATUS FOR MOUNTING AND ALIGNING COMPONENTS OF AN INK JET PRINTHEAD

TECHNICAL FIELD

The present invention relates to continuous ink jet printers and, more particularly, to mounting and aligning a drop generator and catcher assembly in an ink-jet printhead.

BACKGROUND ART

Ink jet printing systems are known in which a print head defines one or more rows of orifices which receive an electrically conductive recording fluid, such as for instance a water base ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

An existing assembly method for assembling the components of an ink jet printhead includes locating the droplet generator with the aid of an assembly fixture, then using an epoxy or other adhesive to fasten it into place. The charge plate/catcher assembly was then aligned to the droplet generator through the use of external adjustment fixtures. Once a proper alignment was achieved, the charge plate/catcher assembly was fastened with screws to the common frame holding the droplet generator.

Unfortunately, existing assembly and alignment methods have several problems. For instance, the use of adhesive increases assembly cycle time, since it takes several hours for the adhesive to cure. The use of epoxy is also problematic in that epoxy is temperature and humidity sensitive. Finally, the sensitivity of the alignment is such that the final fastening of charge plate/catcher assembly once alignment is achieved can and does alter the alignment, requiring a realignment. It is seen then that there is a need for an apparatus for mounting and alignment components of an ink jet printhead which overcomes the problems associated with existing techniques.

SUMMARY OF THE INVENTION

This need is met by the system according to the present invention, wherein a means is provided for mounting and aligning the drop charging and deflected drop collector, and the droplet generator within the structure that holds the two parts. These two elements must be precisely positioned relative to each other in order to ensure ink-jet imaging. The preciseness of this alignment is beyond acceptable machining tolerances that would permit mechanically fastening two elements in a frame with no further adjustment.

In accordance with one aspect of the present invention, a mounting and alignment apparatus for a continuous ink jet printer has a jet array including a plurality of jets, and a plurality of charge leads, and further has a drop charging and deflected drop collector and a droplet generator. The apparatus comprises first and second degrees of freedom of adjustment for positioning the jet array with respect to the plurality of charge leads, and a third degree of freedom of adjustment for adjusting the jet array such that the plurality of jets are aligned with respect to the plurality of charge leads.

The flexure allowed by the degrees of freedom provides a variety of advantages. First, the flexure provides spring force so the degrees of freedom of adjustment are self-locking. Second, the flexure allows the frame containing the drop generator and catcher assembly to move in a parallelogram fashion, thereby preventing rotation of the frame. Other objects and advantages of the invention will be apparent from the following description, the accompanying drawings and the appended claims.

DETAILED DESCRIPTION OF THE PREFERRED EMBODIMENTS

The present invention provides a means for mounting and aligning two components, including (1) the drop charging and deflected drop collector and (2) the droplet generator of an ink jet printhead, within a frame structure for holding the two components. The precise positioning of the alignment is achieved by incorporating three degrees of freedom of adjustment into the frame which are self-locking. The inclusion of a spring means biases the frame in a first direction, and the inclusion of a screw means biases the frame in an opposite second direction with equal force.

Figure 1:
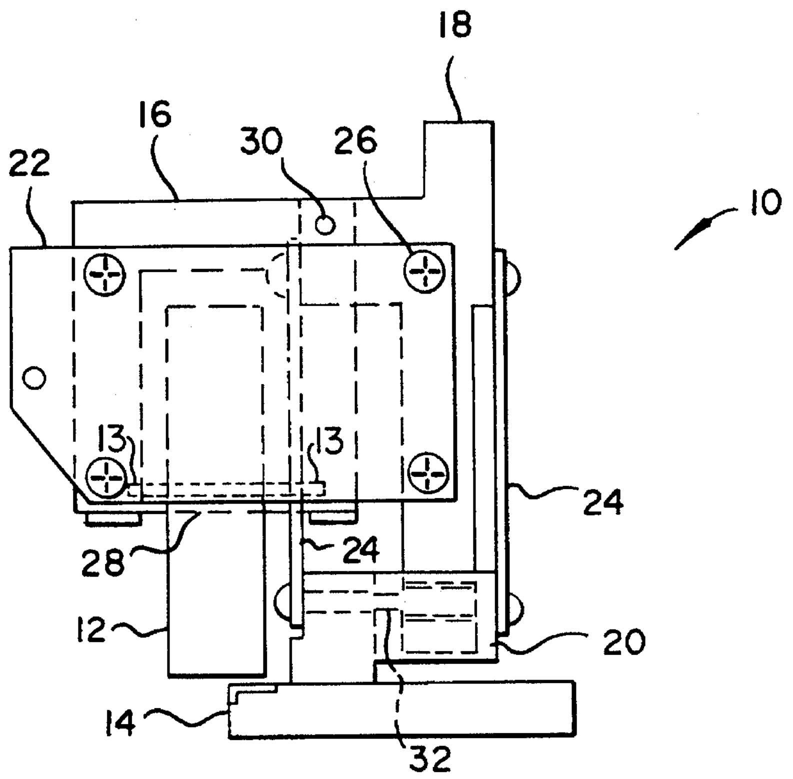
FIG. 1 is a side view of a continuous ink jet printhead incorporating the present invention.

Referring now to the drawings, in FIG. 1 a side view of an ink-jet printhead 10 is illustrated. The printhead 10 includes a droplet generator 12 supported by pins 13, and a drop charging and deflected drop collector, or charge plate/catcher assembly, 14. The droplet generator 12 and the drop charging and deflected drop collector 14 are mounted with a frame assembly. The frame assembly is comprised of a resonator frame 16, a main frame 18, a catcher mount 20, a pair of resonator flexures 22, a pair of catcher flexures 24, and screw means 26.

Figure 2:
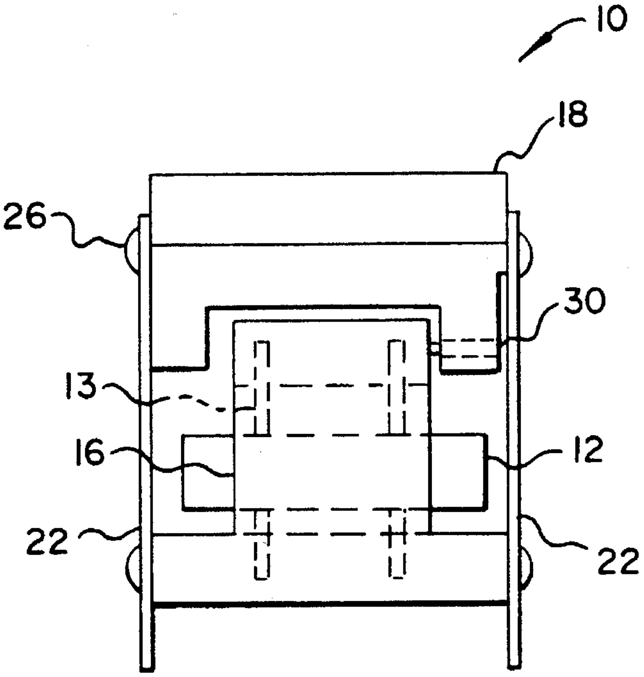
FIG. 2 is a top view of the apparatus of FIG. 1.
Figure 3:
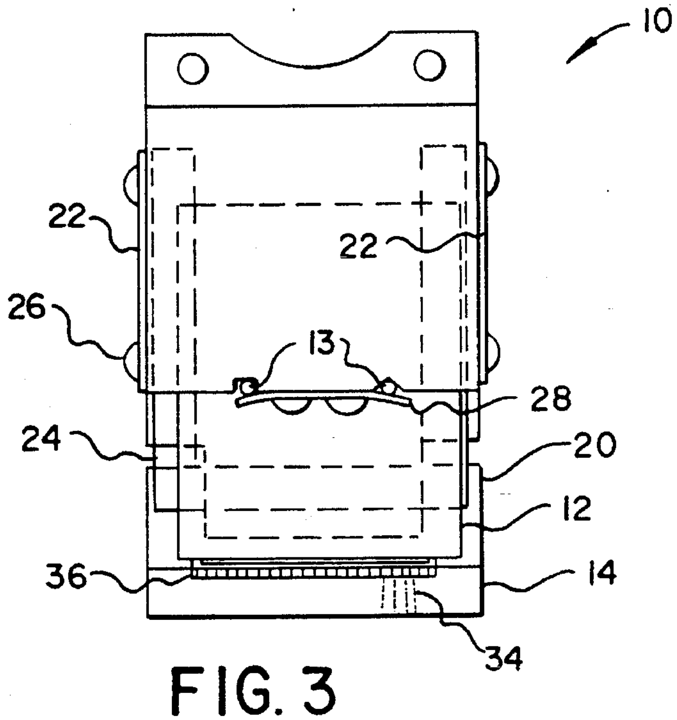
FIG. 3 is a front view of the apparatus of FIG. 1.

Continuing with FIG. 1, the pins 13 are typically situated just above the surface of the resonator frame 16 so that as a retainer 28 is screwed or otherwise forced down, the pins 13 are clamped into place. This causes the retainer 28 to bow, as illustrated in FIG. 3. The retainer 28, which may be any suitable retaining means including a steel spring, holds the droplet generator 12 and the resonator frame 16 together. An adjusting set screw 30 then applies force to the resonator frame 16 to affect adjustment of the droplet generator 12 relative to the drop charging and deflected drop collector 14. The resonator frame 16 can then be held in place by the resonator flexures 22 with respect to the main frame 18. Also, the catcher mount 20 is held in place by the catcher flexures 24, which are typically U-shaped. FIG. 2 shows a top view of the ink jet printhead 10 of FIG. 1 to illustrate how the resonator flexures 22 are supporting the resonator frame 16 relative to the main frame 18.

Referring now to FIG. 3 and continuing with FIG. 1, the mounting and aligning apparatus of the present invention incorporates three degrees of freedom of adjustment into the frame assembly. The three degrees of freedom of adjustment are self-locking, so once alignment is achieved, there are no other fastening or locking steps needed to hold the components 10 and 12 together. The first degree of freedom is the positioning distance of a jet array 34 to a plurality of charge leads 36 and the second degree of freedom is the parallelism of the jet array 34 to the charge leads 36.

Figure 4:
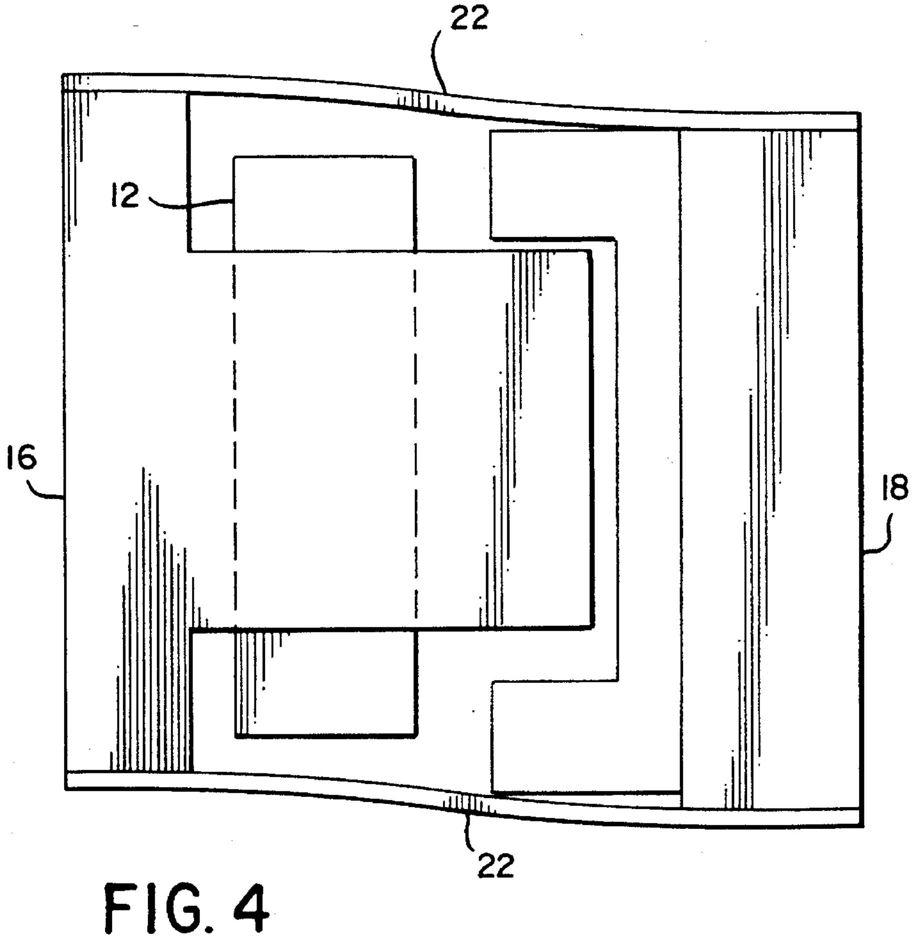
FIG. 4 illustrates a parallelogram movement enforced by a flexure design illustrated in FIGS. 1–3.

The plurality of charge leads 36 are integral to the drop charging and deflected drop collector 14, which is mounted to the catcher mount 20. The catcher mount 20 is supported from the main frame 18 by the catcher flexures 24. When fastened together, the main frame 18, the catcher mount 20, and the catcher flexures 24 form a typical mechanism known as a flexure, and flexure prevents rotation of movement of a part perpendicular to the plane of movement, as illustrated in FIG. 4. Since the catcher flexures 24 are actually U-shaped, two pairs, or four, catcher flexures 24 are created.

Continuing with the first and second degrees of freedom of adjustment, adjusting screws 32 will permit the adjustment to move the drop charging and deflected drop collector 14 and the catcher mount 20 together relative to the droplet generator 12, the resonator frame 16, the main frame 18, and the resonator flexures 22. In other words, the charge leads 36 on the drop charging and deflected drop collector 14 can be moved toward the jet array 34 that emanates from the droplet generator 12. Adjusting screws 32 located at either extreme of the main frame 18 and the catcher mount 20 will permit a slight rotational adjustment which is parallel to the plane of movement of the drop charging and deflected drop collector 14 and the catcher mount 20, relative to the droplet generator 12, the resonator frame 16, the main frame 18, and the resonator flexures 22.

In a preferred embodiment, the adjusting screws 32 comprise differential screws, whereby threads of a different pitch are on the same shaft. Preferably, a thread measuring 4-40 is threadable into the catcher mount 20, and a thread measuring 8-36 is threadable out of the main frame 18. As the differential adjusting screws 32 turn, they advance into the catcher mount 20 at a rate of forty threads per inch and out of the main frame at a rate of thirty-six threads per inch, so that the net effect, which is the distance that the catcher mount 20 is pushed apart from the main frame 18, is the difference between the two thread rates. Therefore, while a finer thread is advancing into the catcher mount 20 and a coarser thread is advancing out of the main frame 18, the net result is that the catcher mount 20 and the main frame 18 separate from each other at the rate of the difference of the two thread pitches. Since a smaller difference between the two threads creates a finer adjustment, the thread pitches of the differential adjusting screws 32 can be changed according to the adjustment desired.

If both adjusting screws 32 are turned simultaneously in the same direction, the charge leads 36 are brought closer to the jet array 34, which is the first degree of freedom of adjustment. If only one of the adjusting screws 32 is turned, or both adjusting screws 32 are turned in opposite directions, this causes rotation of the charge leads 36 relative to the jet array 34 to situate the charge leads 36 in a direction parallel to the jet array 34. The advantage of using the adjusting screws 32, then is to provide an extremely sensitive adjustment, particularly when combined with the third degree of freedom of adjustment.

Referring now to FIG. 2, the third degree of freedom of adjustment described. The third degree of freedom of adjustment is the ability to adjust the jet array 34 so as to align and center the jets 34 in front of the charge leads 36. As shown in FIG. 2, the droplet generator 12 is fastened to the resonator frame 16 via the screw, means 26, the retainer 28, and the pins 13. The resonator frame 16 is supported from the main frame 18 by the resonator flexures 26. Once again, when fastened together, the resonator frame 16, the main frame 18, and the resonator flexures 22 form a typical mechanism known as a flexure, which flexure prevents rotation of movement of a part perpendicular to the plane of movement, as illustrated in FIG. 4.

The third degree of freedom of translation is achieved by the adjusting set screw 30. When the adjusting set screw 30 is adjusted, it pushes on the resonator frame 16 and permits the jet array 34 that emanates from the droplet generator 12 to translate parallel to the charge leads 36. Therefore, the jet array 34 can be aligned and centered appropriately. Besides permitting extremely precise adjustment, using the flexure and set screw 30 adjustment provides an additional benefit. The additional benefit is that the stored energy in the flexures after adjustment provides a preload on the adjustment screw, thus locking the screw 30 and the adjustment in place.

Referring now to FIG. 4, the resonator flexures 22 are shown in their distorted shape after the third degree of freedom of adjustment was made. The first and second degrees of freedom of adjustment are degrees of freedom of translation and rotation, while the third degree of freedom of adjustment is a degree of freedom of translation. Clearly, it can be seen that the resonator frame 16 and the droplet generator 12 have translated only, and there was no rotation perpendicular to this plane of motion.

The present invention provides for a means for mounting and aligning two components, including the drop charging and deflected drop collector 14 and the droplet generator 12 of the ink jet printhead 10, within a frame structure. The precise positioning of the alignment is achieved by incorporating three degrees of freedom of adjustment into the frame structure. The first degree of freedom, which is the positioning distance of the jet array 34 to the charge leads 36, is usually done first. The second degree of freedom, which is the parallelism of the jet array 34 to the charge leads 36 is typically done next. Finally, the third degree of freedom, which is the ability to adjust the jet array 34 so as to align and center the jets 34 in front of the charge leads 36, is done third. The first and second degrees of freedom can then be fine tuned to achieve precise alignment.

Although the preferred mode of practicing the invention has been described with reference to an ink jet print head for a continuous ink jet printer, the principle of the present invention can also be applied to a wide variety of ink jet printers.

INDUSTRIAL APPLICABILITY AND ADVANTAGES

The mounting and alignment apparatus according to the present invention is useful in continuous ink jet printers. The mounting and alignment apparatus of the present invention provide for self-contained three degrees of freedom adjustment of critical alignment parameters. The adjustments according to the present application have the advantage of being extremely precise, sensitive, and easy to make. Once the proper adjustment has been achieved, no further secondary steps, such as locking or fastening, are required, thereby eliminating the possibility of disturbing the adjustment during a secondary step. The three degrees of freedom are self-locking, due to the force imposed by the resonator and catcher flexures on the adjusting screws. Finally, since the two critical elements are mechanically mounted, the manufacturing build and cycle time is shortened and the apparatus is less sensitive to operating environment variations.

Having described the invention in detail and by reference to the preferred embodiment thereof, it will be apparent that other modifications and variations are possible without departing from the scope of the invention defined in the appended claims.

What is claimed is:

1. A mounting and alignment apparatus for a continuous ink jet printer having a jet array including a plurality of jets, and a plurality of charge leads, and further having a frame containing a drop charging and deflected drop collector and a droplet generator, the apparatus comprising:

first and second degrees of freedom of adjustment for positioning the plurality of charge leads with respect to the jet array; and a third degree of freedom of adjustment for adjusting the jet array such that the plurality of jets are aligned with respect to the plurality of charge leads, wherein the first, second, and third degrees of freedom of adjustment are self-locking.

2. A mounting and alignment apparatus as claimed in claim 1 wherein the drop charging and deflected drop collector is aligned with the droplet generator.

3. A mounting and alignment apparatus as claimed in claim 1 further comprising flexure means, the flexure means providing a spring force so the first, second, and third degrees of freedom of adjustment are self-locking.

4. A mounting and alignment apparatus as claimed in claim 1 further comprising flexure means, the flexure means allowing the frame containing the drop charging and deflected drop collector and the droplet generator to move in a parallelogram fashion.

5. A mounting and alignment apparatus as claimed in claim 1 wherein the first degree of freedom of adjustment provides a positioning distance of the jet array to the plurality of charge leads.

6. A mounting and alignment apparatus as claimed in claim 1 wherein the second degree of freedom of adjustment provides parallelism of the jet array to the plurality of charge leads.

7. A mounting and alignment apparatus as claimed in claim 1 wherein the jet array is held stationary and the plurality of charge leads are moved to position the plurality of charge leads with respect to the jet array.

8. A mounting and alignment apparatus as claimed in claim 1 wherein the third degree of freedom of adjustment provides the ability to adjust the jet array so as to align and center the plurality of jets in front of the plurality of charge leads.

9. A mounting and alignment apparatus as claimed in claim 1 wherein the plurality of charge leads are held stationary and the plurality of jets are moved to align the plurality of jets with respect to the plurality of charge leads.

10. A mounting and alignment apparatus for a continuous ink jet printer having a jet array including a plurality of jets, and a plurality of charge leads, and further having a frame containing a drop charging and deflected drop collector and a droplet generator, the apparatus comprising:

first and second degrees of freedom of adjustment for positioning the plurality of charge leads with respect to the jet array;

a third degree of freedom of adjustment for adjusting the jet array such that the plurality of jets are aligned with respect to the plurality of charge leads;

a spring means for biasing the frame in a first direction; and a screw means for biasing the frame in a second, opposite, direction with equal force.

11. An ink jet printhead used in an ink jet printer comprising:

a means for mounting a droplet generator and a drop charging and collecting device in a common frame;

a means for moving the droplet generator in a substantially parallel direction relative to the drop charging and collecting device;

a means for moving the drop charging and collecting device in translation and rotation to achieve a parallel alignment of a plurality of charge leads to a jet array;

a means for prepositioning the droplet generator and the drop charging and collecting device on a spring structure; and a means for aligning and holding the droplet generator and the drop charging and collecting device.

12. An ink jet printhead as claimed in claim 11 wherein the means for aligning and holding the droplet generator and the drop charging and collecting device further comprises means for biasing the droplet generator and the drop charging and collecting device against a force imposed by the spring structure.

13. A method of mounting and aligning a drop charging and deflected drop collector and a droplet generator of an ink jet printer, within a frame, the printer having a jet array including a plurality of jets, and a plurality of charge leads, the method comprising the steps of:

positioning the plurality of charge leads with respect to the jet array;

adjusting the jet array such that the plurality of jets are aligned with respect to the plurality of charge leads; and providing flexure means, the flexure means allowing the frame containing the drop charging and deflected drop collector and the droplet generator to move in a parallelogram fashion.

14. A method of mounting and aligning as claimed in claim 13 wherein the step of positioning the plurality of charge leads with respect to the jet array comprises first and second degrees of freedom of adjustment.

15. A method of mounting and aligning as claimed in claim 14 wherein the first degree of freedom of adjustment provides a positioning distance of the jet array to the plurality of charge leads.

16. A method of mounting and aligning as claimed in claim 14 wherein the second degree of freedom of adjustment provides parallelism of the jet array to the plurality of charge leads.

17. A method of mounting and aligning as claimed in claim 13 wherein the step of adjusting the jet array such that the plurality of jets are aligned with respect to the plurality of charge leads comprises a third degree of freedom of adjustment.

18. A method of mounting and aligning as claimed in claim 17 wherein the third degree of freedom of adjustment provides the ability to adjust the jet array so as to align and center the plurality of jets in front of the plurality of charge leads.

19. A method of mounting and aligning as claimed in claim 13 further comprising the steps of:

holding the plurality of charge leads stationary; and moving the plurality of jets to align the plurality of jets with respect to the plurality of charge leads.

20. A method of mounting and aligning as claimed in claim 13 further comprising the steps of:

biasing the frame in a first direction with a spring means; and biasing the frame in a second, opposite, direction with equal force with a screw means.

* * * * *